(12) United States Patent
Arbesman

(10) Patent No.: US 12,116,078 B2
(45) Date of Patent: Oct. 15, 2024

(54) BRAKE PAD ASSEMBLY FOR A BICYCLE AND METHOD FOR ASSEMBLING A BRAKE PAD ASSEMBLY FOR A BICYCLE

(71) Applicant: Nucap Industries Inc., Toronto (CA)

(72) Inventor: Roman Arbesman, Toronto (CA)

(73) Assignee: NUCAP INDUSTRIES INC., Toronto (CA)

( * ) Notice: Subject to any disclaimer, the term of this patent is extended or adjusted under 35 U.S.C. 154(b) by 317 days.

(21) Appl. No.: 17/460,963

(22) Filed: Aug. 30, 2021

(65) Prior Publication Data

US 2023/0069093 A1     Mar. 2, 2023

(51) Int. Cl.
  *B62L 1/00* (2006.01)
  *B62L 1/10* (2006.01)
  *F16D 65/095* (2006.01)
  *F16F 3/02* (2006.01)

(52) U.S. Cl.
  CPC ............... *B62L 1/005* (2013.01); *B62L 1/10* (2013.01); *F16D 65/095* (2013.01); *F16F 3/023* (2013.01); *F16D 2250/0046* (2013.01); *F16D 2250/0084* (2013.01)

(58) Field of Classification Search
  CPC .. B62L 1/005; B62L 1/10; F16F 3/023; F16D 65/095; F16D 2250/0046; F16D 2250/0084
  See application file for complete search history.

(56) References Cited

U.S. PATENT DOCUMENTS

| | | | |
|---|---|---|---|
| 3,894,618 A | 7/1975 | Enright | |
| 5,803,207 A | 9/1998 | Nielsen | |
| 6,308,806 B1 | 10/2001 | Nielsen | |
| 6,736,243 B1 | 5/2004 | Fong et al. | |
| 8,550,220 B2 | 10/2013 | Iwai et al. | |
| 9,309,938 B2 | 4/2016 | Nakakura | |
| 2014/0083805 A1 | 3/2014 | Hirotomi | |
| 2018/0216680 A1* | 8/2018 | Merlo | B62L 1/005 |
| 2021/0179228 A1 | 6/2021 | Arbesman et al. | |

FOREIGN PATENT DOCUMENTS

| | | |
|---|---|---|
| CA | 3109417 A1 | 2/2020 |
| DE | 19746572 A1 | 4/1999 |
| EP | 0542134 A1 | 5/1993 |
| EP | 3431804 A1 | 1/2019 |
| KR | 20120097576 A | 9/2012 |

OTHER PUBLICATIONS

Extended European Search Report for European Patent Application No. 21193866.7, dated Feb. 17, 2022.

* cited by examiner

*Primary Examiner* — Pamela Rodriguez
(74) *Attorney, Agent, or Firm* — Aird & McBurney LP

(57) ABSTRACT

A brake pad assembly for a bicycle includes a first brake pad, a second brake pad, and a spreader spring. The first brake pad has a first backing plate with a first rotor facing surface, and a first friction pad secured to the rotor facing surface. The second brake pad has a second backing plate with a second rotor facing surface, and a second friction pad secured to the second rotor facing surface and facing the first friction pad. The spreader spring has a first leaf that is fixed to the first brake pad and a second leaf that is fixed to the second brake pad. At least a portion of the first leaf is positioned between the first rotor facing surface and the first friction pad, and at least a portion of the second leaf is positioned between the second rotor facing surface and the second friction pad.

20 Claims, 7 Drawing Sheets

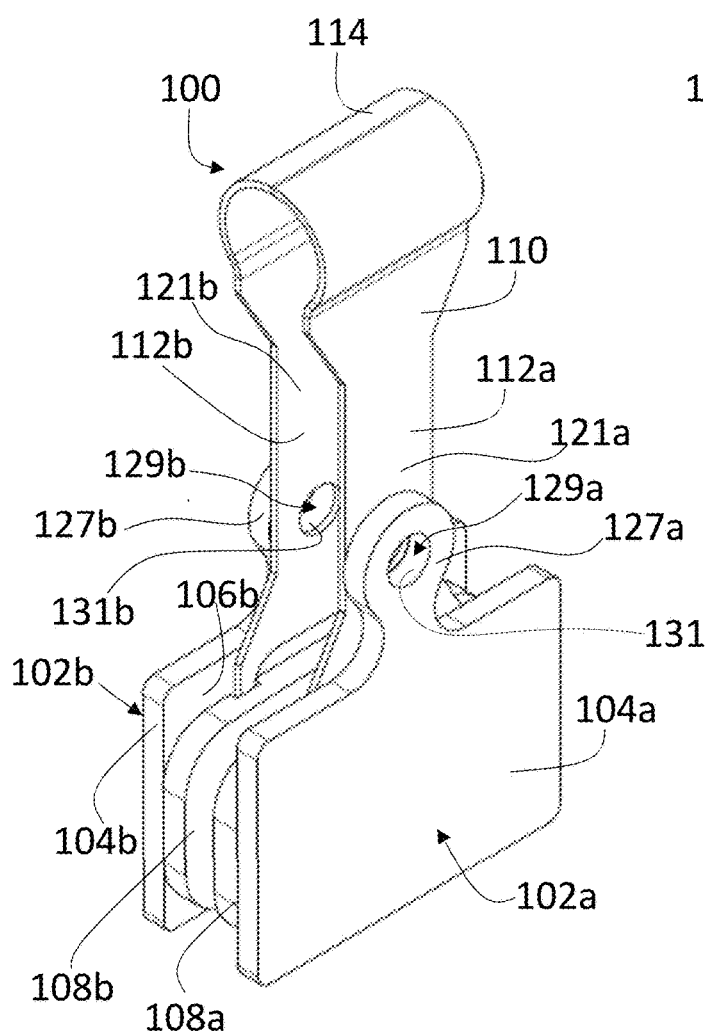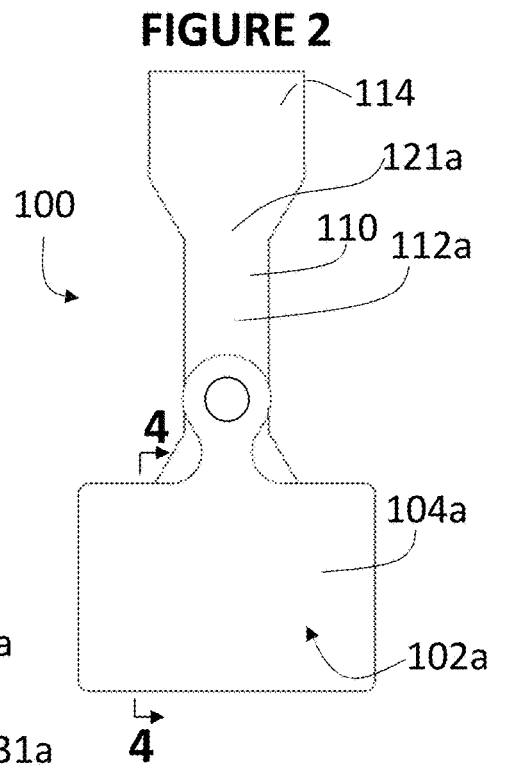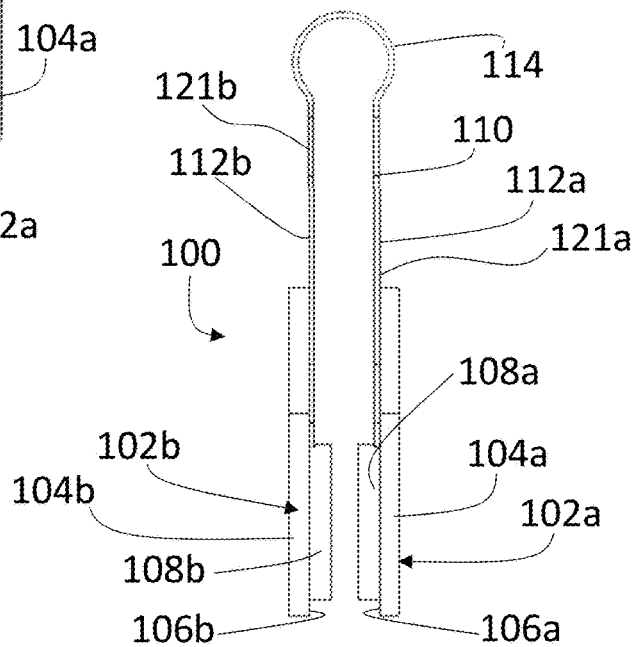
FIGURE 1
FIGURE 2
FIGURE 3

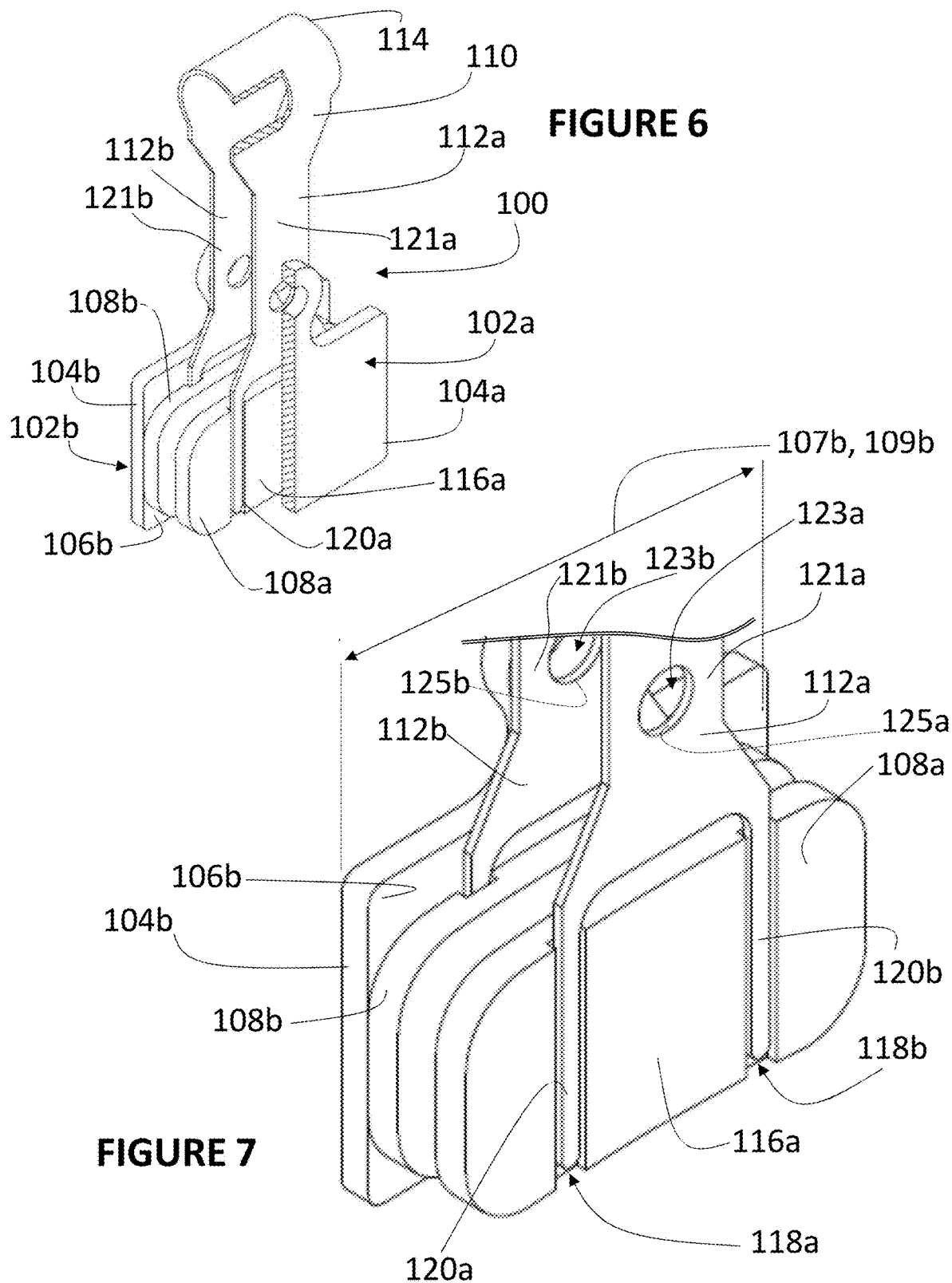

BRAKE PAD ASSEMBLY FOR A BICYCLE AND METHOD FOR ASSEMBLING A BRAKE PAD ASSEMBLY FOR A BICYCLE

FIELD

This document relates to disc brakes for bicycles. More specifically, this document relates to brake pad assemblies for bicycle disc brakes, spreader springs for such brake pad assemblies, and methods for assembling such brake pad assemblies.

BACKGROUND

U.S. Pat. No. 6,318,514 (Hinkens et al.) discloses a disc brake assembly that includes an improved pad holder for holding a brake pad in the brake assembly. The pad holder takes the form of a simple spring clip, preferably a wire form, that holds the rear surface of the pad tightly against the front surface of the piston or pistons of the associated caliper to prevent brake drag and brake rattle.

U.S. Pat. No. 6,394,236 (Matsuishita) discloses a bicycle cable disc brake that is provided with an adjustable return spring for moving the cable disc brake from a braking position to a release position. The cable disc brake has a cable housing, a pair of friction members, a cable actuated mechanism and a biasing member. The first friction member is movably coupled to the caliper housing between a release position and a braking position. The second caliper is also coupled to the caliper housing and arranged substantially parallel to the first friction member to form a rotor receiving slot therebetween. The cable actuated mechanism is movably coupled to the caliper housing to move the first friction member from the release position towards the second friction member to the braking position. The biasing member has a first end adjustably coupled to the caliper housing and a second end adjustably coupled to the cable actuated mechanism to urge the cable actuated mechanism to the release position.

SUMMARY

The following summary is intended to introduce the reader to various aspects of the detailed description, but not to define or delimit any invention.

Spreader springs for bicycle brake pad assemblies are disclosed. According to some aspects, a spreader spring for a bicycle brake pad assembly includes a first leaf for fixing to a first brake pad, a second leaf for fixing to a second brake pad, and a spring joint joining the first leaf to the second leaf. The first leaf has a first aperture extending therethrough for receipt of a pin. The first aperture is defined by a first side wall. The second leaf has a second aperture extending therethrough and aligned with the first aperture for receipt of the pin. The second aperture is defined by a second side wall. The spring joint biases the spreader spring towards a spread position in which the first leaf and second leaf are spaced apart from each other, and is moveable to a compressed position in which the first leaf and second leaf are slid towards each other along the pin relative to the spread position. A barrier layer lines at least the first side wall and the second side wall to prevent contact between the first side wall and the pin and the second side wall and the pin, to mitigate noise generated by sliding of the first leaf and second leaf along the pin.

In some examples, the first leaf includes at least a first tine for fixing to the first brake pad, and a first body joining the first tine to the spring joint and through which the first aperture extends. The barrier layer can coat at least majority of the first body. In some further examples, the second leaf include at least a second tine for fixing to the second brake pad, and a second body joining the second tine to the spring joint and through which the second aperture extends. The barrier layer can further coat at least majority of the second body. The barrier layer can further coat the spring joint.

In some examples, the barrier layer is in the form of a unitary coating applied to the spring joint, the first leaf, and the second leaf.

In some examples, the barrier layer lines an entirety of the first side wall and an entirety of the second side wall.

Brake pad assemblies for bicycles are also disclosed. According to some aspects, a brake pad assembly for a bicycle includes a first brake pad, a second brake pad, and a spreader spring. The first brake pad has a first backing plate with a first rotor facing surface, and a first friction pad secured to the rotor facing surface. The second brake pad has a second backing plate with a second rotor facing surface, and a second friction pad secured to the second rotor facing surface and facing the first friction pad. The spreader spring has a first leaf fixed to the first brake pad, a second leaf fixed to the second brake pad, and a spring joint joining the first leaf to the second leaf. The first leaf has a first leaf aperture extending therethrough for receipt of a pin, and the first leaf aperture is defined by a first side wall. The second leaf has a second leaf aperture extending therethrough and aligned with the first leaf aperture for receipt of the pin. The second leaf aperture is defined by a second side wall. The spring joint biases the spreader spring towards a spread position in which the first leaf and second leaf are spaced apart from each other, and is moveable to a compressed position in which the first leaf and second leaf are slid towards each other along the pin relative to the spread position. The spreader spring further includes a barrier layer lining at least the first side wall and the second side wall to prevent contact between the first side wall and the pin and the second side wall and the pin, to mitigate noise generated by sliding of the first leaf and second leaf along the pin.

In some examples, the first leaf includes at least a first tine fixed to the first brake pad, and a first body joining the first tine to the spring joint and through which the first leaf aperture extends. The first backing plate can further include a first boss that overlies an outer surface of the first leaf. The first boss can include a first boss aperture that is aligned with the first leaf aperture for receipt of the pin, and the first boss aperture can be defined by a first boss aperture side wall. The barrier layer can further line the first boss aperture side wall.

In some examples, the second leaf includes at least a second tine fixed to the second brake pad, and a second body joining the second tine to the spring joint and through which the second leaf aperture extends. The second backing plate can further include a second boss that overlies an outer surface of the second leaf. The second boss can include a second boss aperture that is aligned with the second leaf aperture for receipt of the pin, and the second boss aperture can be defined by a second boss aperture side wall. The barrier layer can further line the second boss aperture side wall.

In some examples, the barrier layer is in the form of a unitary coating applied to the spring joint, the first body, the second body, the first boss, and the second boss.

In some examples, the first leaf includes at least a first tine fixed to the first brake pad, and a first body joining the first tine to the spring joint and through which the first leaf aperture extends. The barrier layer can coat at least majority of the first body. In some further examples, the second leaf include at least a second tine fixed to the second brake pad, and a second body joining the second tine to the spring joint and through which the second leaf aperture extends. The barrier layer can further coat at least majority of the second body. The barrier layer can further coat the spring joint.

In some examples, the barrier layer is in the form of a unitary coating applied to the spring joint, the first leaf, and the second leaf.

In some examples, the barrier layer lines an entirety of the first side wall and an entirety of the second side wall.

Methods for assembling brake pad assemblies for bicycles are also disclosed. According to some aspects, a method of assembling a brake pad assembly for a bicycle includes: a) fixing at least a first tine of a first leaf of a spreader spring to a first brake pad; b) fixing at least a second tine of a second leaf of the spreader spring to a second brake pad; c) dipping at least the spreader spring in a molten barrier material to coat a side wall of an aperture of the first leaf and a side wall of an aperture of the second leaf with the molten barrier material; and e) solidifying the molten barrier material to yield a barrier layer lining the side wall of the aperture of the first leaf and the side wall of the aperture of the second leaf.

In some examples, the method further includes inserting a pin through the first aperture and the second aperture to mount the brake pad assembly in a brake caliper. The method can further include compressing the spreader spring to slide the first leaf and second leaf towards each other along the pin.

In some examples, the first brake pad includes a first boss that overlies an outer surface of the first leaf, and the first boss includes a first boss aperture that is aligned with the aperture of the first leaf and that is defined by a first boss aperture side wall. Step c) can further include dipping the first boss in the molten barrier material to coat the first boss aperture side wall with the molten barrier material.

In some examples, the second brake pad includes a second boss that overlies an outer surface of the second leaf, and the second boss includes a second boss aperture that is aligned with the aperture of the second leaf and that is defined by a second boss aperture side wall. Step c. can further include dipping the second boss in the molten barrier material to coat the second boss aperture side wall with the molten barrier material.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 1 is a perspective view of an example brake pad assembly;

FIG. 2 is a front view of the assembly of FIG. 1;

FIG. 3 is a side view of the assembly of FIG. 1;

FIG. 6 is a perspective cutaway view of the assembly of FIG. 1;

FIG. 7 is an enlarged perspective view of the brake pads of the assembly of FIG. 1, with the second brake pad removed to show the plate facing surface of the friction pad;

DETAILED DESCRIPTION

Figure 4:
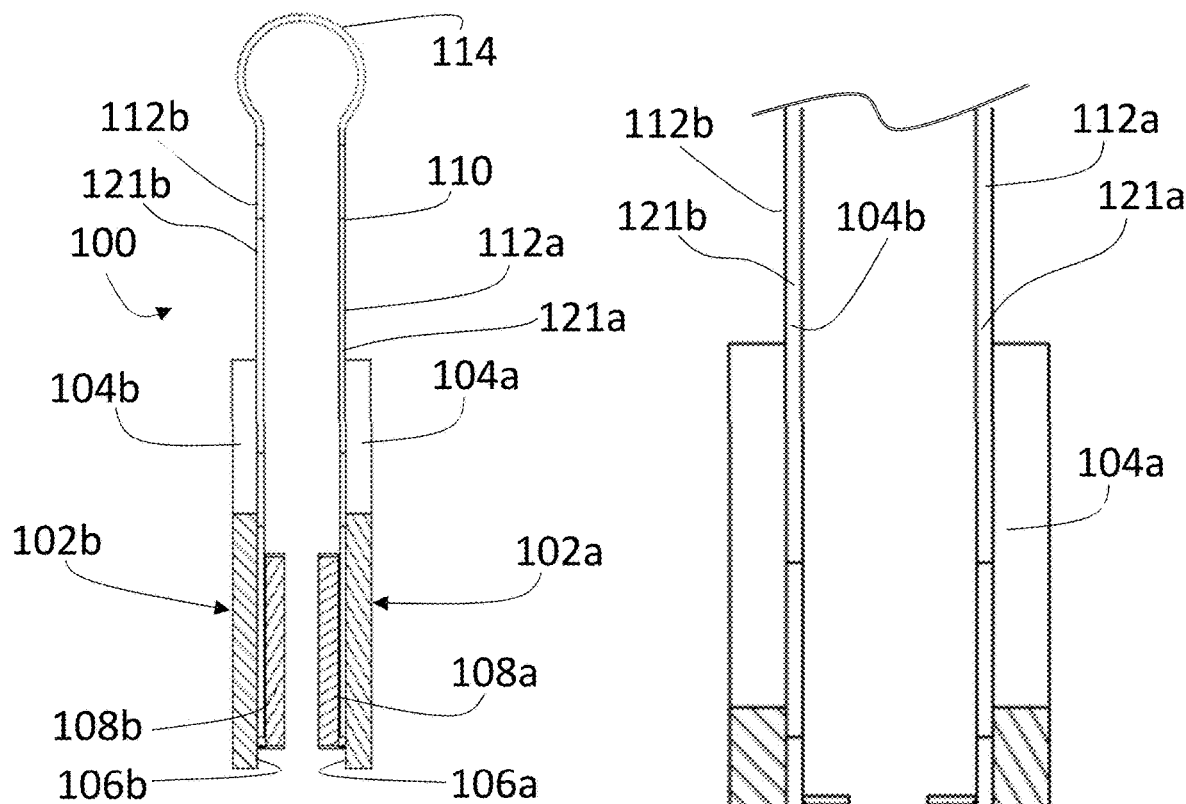
FIG. 4 is a cross-section taken along line 4-4 in FIG. 2.
Figure 5:
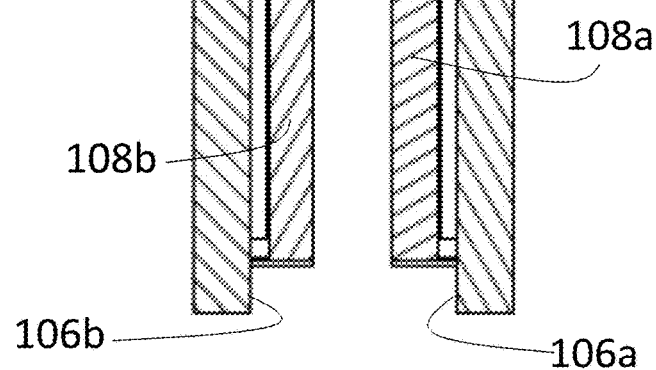
FIG. 5 is an enlarged view of a portion of FIG. 4.

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Generally disclosed herein are brake pad assemblies for bicycles, and particularly for use in bicycle disc brakes. The brake pad assemblies can generally include a pair of brake pads and a spreader spring, all three of which are fixed together (e.g. permanently fixed together) and provided as a one-piece unit. Fixing together of the three parts can allow for ease of handling and installation. In some examples, the three parts are fixed together during assembly of the brake pads themselves. That is, in some examples, as opposed to a two-step process of assembling the brake pads and then assembling the spreader spring to the brake pads, there is a single step of assembling the brake pads and concurrently assembling the spreader spring to the brake pads.

Further disclosed herein are brake pads that are configured to reduce or prevent or mitigate noise generated during braking. That is, the brake pad assembly can be mounted in a brake caliper by inserting a metallic pin through a metallic spreader spring of the brake pad assembly. In use, when the bicycle brake is actuated, the spreader spring can slide along the pin towards a compressed position, so that the brake pads contact a rotor of the bicycle. In order to reduce or prevent or mitigate noise generated by sliding of the metallic spreader spring along the metallic pin, a barrier layer can be provided on the spreader spring that prevents direct metal-to-metal contact between the spreader spring and the pin. Furthermore, depending on the configuration of the brake pads, the barrier layer can further be provided on a portion of the brake pads, to prevents direct metal-to-metal contact between the brake pads and the pin. The barrier layer can be readily applied to the assembly by providing the barrier layer as a molten material and dipping a portion of the assembly in the molten material. Because the brake pads and spreader spring can be provided as a one-piece unit, a single dipping step can be used to coat the requisite portions of the assembly.

As used herein, the term 'fixed to' means that the referenced parts cannot be manually separated without destroying or damaging the referenced parts such that they cannot be put back together (for example, the referenced parts cannot be separated by manual removal of a pin or clip or by sliding the parts apart manually). As used herein, the term 'permanently fixed to' means that the referenced parts cannot be separated, whether manually or otherwise, without damaging or destroying the referenced parts such that they cannot be put back together (for example, the referenced parts cannot be separated with the use of a tool or machine).

Referring now to FIGS. 1 to 3, a first example brake pad assembly 100 is shown. The assembly 100 includes a pair of brake pads, 102a, 102b. Each of the brake pads 102a, 102b has a respective backing plate 104a, 104b with a respective rotor facing surface 106a, 106b. A respective friction pad 108a, 108b is secured to each rotor facing surface 106a, 106b. In this document, the brake pads 102a, 102b may in some instances be referred to as a 'first' brake pad 102a and a 'second' brake pad 102b. Furthermore, the backing plate 104a, rotor facing surface 106a, and friction pad 108a of the first brake pad 102a may be referred to as a 'first' backing plate 104a, 'first' rotor facing surface 106a, and 'first' friction pad 108a. Likewise, the backing plate 104b, rotor facing surface 106b, and friction pad 108b of the second brake pad 102b may be referred to as a 'second' backing plate 104b, 'second' rotor facing surface 106b, and 'second' friction pad 108b. The first friction pad 108a and second friction pad 108b face each other, so that in use, upon application of a braking force (e.g. by the squeezing of hand breaks), the friction pads 108a, 108b are compressed towards each other to squeeze a rotor of the bicycle (not shown).

The backing plates 104a, 104b may optionally be metallic, e.g. steel backing plates, and may, for example, be fabricated by stamping.

The friction pads 108a, 108b may be made from any suitable friction material, such as resin with various additives and fillers. As will be described in further detail below, the friction pads 108a, 108b may optionally be pre-formed and secured to the respective rotor facing surfaces 106a, 106b, for example by using a mechanical fastener or an adhesive. Alternatively, the friction pads 108a, 108b may be molded onto the respective rotor facing surfaces 106a, 106. Optionally, the rotor facing surfaces 106a, 106b may include barbs for retaining the friction pads 108a, 108b, for example by impaling pre-formed friction pads 108a, 108b onto the barbs, or by moulding the friction pads 108a, 108b onto the barbs.

Referring still to FIGS. 1 to 3, the brake pad assembly 100 further includes a spreader spring 110, which functions to spread the friction pads 108a, 108b apart from the rotor after the braking force is released. Particularly, the spreader spring 110 is biased towards a spread position, shown in FIGS. 1 to 7, in which the first brake pad 108a and second brake pad 108b are spaced apart from each other. The spreader spring 110 is moveable to a compressed position (not shown) in which the first brake pad 108a and the second brake pad 108b are moved towards each other relative to the spread position. The spreader spring is preferably metallic (e.g. stainless steel).

Referring still to FIGS. 1 to 3, as mentioned above, the brake pads 102a, 102b are preferably fixed to the spreader spring 110—i.e. they cannot be manually separated without destruction or damage of the parts, as described above. More specifically, in the example shown, the brake pads 102a, 102b are permanently fixed to the spreader spring 110—i.e. they cannot be separated at all without destruction or damage of the parts as described above. Namely, in the example shown, the spreader spring 110 has a pair of leaves 112a, 112b, also referred to herein as a first leaf 112a and a second leaf 112b. The first leaf 112a and the second leaf 112b are joined together at a generally U-shaped spring joint 114, which is resiliently flexible. The first leaf 112a is permanently fixed to the first brake pad 102a, and the second leaf 112b is permanently fixed to the second brake pad 102b.

The leaves 112a, 112b of the spreader spring 110 may be fixed to the respective brake pads 102a, 102b in a variety of ways, for example by the use of adhesives or mechanical fasteners such as rivets. Furthermore, only a portion of each leaf 112a, 112b may be fixed to the respective brake pads 102a, 102b, or an entirety of each leaf 112a, 112b may be fixed to the respective brake pads 102a, 102b.

Referring to FIGS. 4 to 7, in the example shown, a portion of the first leaf 112a is positioned and fixed in place between the first rotor facing surface 106a and the first friction pad 108a, and a portion of the second leaf 112b is positioned and fixed in place between the second rotor facing surface 106b and the second friction pad 108b. More specifically, referring to FIG. 7, the first friction pad 108a has a first plate facing surface 116a, and the plate facing surface 116a has a pair of grooves 118a, 118b therein (also referred to herein as a first groove 118a and a second groove 118b). The first leaf 112a of the spreader spring 110 is forked includes a pair of tines 120a, 120b (also referred to herein as a first tine 120a and a second tine 120b), and a body 121a (also referred to herein as a first body 121a) that joins the tines 120a, 120b to the spring joint 114. The first tine 120a is received and fixed in the first groove 118a and the second tine 120b is received and fixed in the second groove 118b. Likewise (and not shown), the second friction pad 108b has a second plate facing surface, and the second plate facing surface has a pair of grooves therein (also referred to herein as a third groove and a fourth groove). The second leaf 112b of the spreader spring 110 is forked, and includes a pair of tines (also referred to herein as a third tine and a fourth tine) and a body 121b (also referred to herein as a second body 121b) that joins the tines to the spring joint 114. The third tine is received and fixed in the third groove and the fourth tine is received and fixed in the fourth groove.

In the example shown, the tines 120a, 120b are fixed in the grooves by friction and by the use of adhesives—i.e. the tines 120a, 120b are tightly sandwiched between the respective friction pads 108a, 108b and backing plates 104a, 104b, and an adhesive is used to further fix the tines 120a, 120b in place. In alternative examples, adhesives alone can be used to fix the tines in the grooves, or friction alone can be used to fix the tines in the grooves, or another technique can be used to fix the tines in the grooves.

Referring to FIG. 7, the rotor facing surface 106b has a plate width 107b, and the friction pad 108b has a pad width 109b. In the example shown, the plate width 107b and the pad width 109b are approximately equal. That is, because the third and fourth tines are positioned in the third and fourth grooves, it is not necessary to leave a space on either side of the friction pad 108b for the tines to sit, and the friction pad 108b can extend the full width of the backing plate 104b. This can allow for improved braking efficiency.

As can be seen in FIGS. 1 to 7, the first backing plate 104a, first leaf 112a, second backing plate 104b, and second leaf 112b each have a respective aperture extending therethrough. More specifically, referring to FIG. 7, the body 121a of the first leaf 112a has an aperture 123a (also referred to herein as a 'first aperture' or 'first leaf aperture') extending therethrough, from an inner surface of the first leaf 112a to an outer surface of the first leaf 112a. The aperture 123a is defined by a sidewall 125a (also referred to herein as a 'first leaf aperture sidewall' or a 'first sidewall'). Likewise, the body 121b of the second leaf 112b has an aperture 123b (also referred to herein as a 'second aperture' or 'second leaf aperture') extending therethrough, from an inner surface of the second leaf 112b to an outer surface of the second leaf 112b. The second aperture 123b is defined by a sidewall 125b (also referred to herein as a 'second sidewall' or a 'second leaf aperture sidewall'). Further, referring back to FIG. 1, the first backing plate 104a includes a first boss 127a that overlies the outer surface of the first leaf 112a. The first boss 127a has an aperture 129a therethrough (also referred to herein as a 'first boss aperture'), and the aperture 129a is defined by a sidewall 131a (also referred to herein as a 'first boss aperture sidewall'). Likewise, the second backing plate 104b includes a second boss 127b that overlies the outer surface of the second leaf 112b. The second boss 127b has an aperture 129b therethrough (also referred to herein as a 'second boss aperture'), and the aperture 129b is defined by a sidewall 131b (also referred to herein as a 'second boss aperture sidewall'). The apertures 123a, 129a, 123b, 129b are aligned along a common axis. Upon installation of the assembly 100 in a brake caliper of a bicycle, a metallic pin can be inserted through the apertures 123a, 129a, 123b, 129b, in order to retain the assembly 100 in place in the caliper. Since in the example shown the apertures 123a, 129a, 123b, 129b are aligned along a common axis and fixed in this position, the pin can be inserted with relative ease.

The brake pad assembly 100 can optionally further include a barrier layer lining the side walls 125a, 125b, 131a, 131b in order to prevent metal-to metal contact between the brake pad assembly 100 and a pin, as will be described below with reference to FIGS. 9, 10A, and 10B.

In general, in order to manufacture the assembly, at least a portion of the first leaf 112a (e.g. the first tine 120a and second tine 120b) can be positioned between the first rotor facing surface 106a and the first friction pad 108a, and the first friction pad 108a can then be secured to the first rotor facing surface 106a, with the portion of the first leaf 121a positioned between the first friction pad 108a and the first rotor facing surface 106a, to concurrently fix the first friction pad 108a to the first backing plate 104a and the first leaf 112a to the first brake pad 102a. Likewise, at least a portion of the second leaf 112b (e.g. the third and fourth tines) can be positioned between the second rotor facing surface 106b and the second friction pad 108b, and the second friction pad 108b can then be secured to the second rotor facing surface 106b with the portion of the second leaf 112b positioned between the second friction pad 108b and the second rotor facing surface 106b, to concurrently fix the second friction pad 108b to the second backing plate 104b and the second leaf 112b to the second brake pad 102b. More specifically, with reference to the first brake pad 102a, the first tine 120a and second tine 120b of the first leaf 112a can be nested within the first groove 118a and second groove 118b of the first friction pad. A bead of adhesive can then be applied to the first plate facing surface 116a and/or to the first rotor facing surface 106a. The first backing plate 104a can then be aligned with the first friction pad 108a, with the first 120a and second 120b tines therebetween, and the first backing plate 104a and first friction pad 108a can be pressed together until the adhesive has set and/or cured and/or dried. This can be repeated with the second brake pad 102b, optionally concurrently with the first brake pad 102a.

Figure 8A:
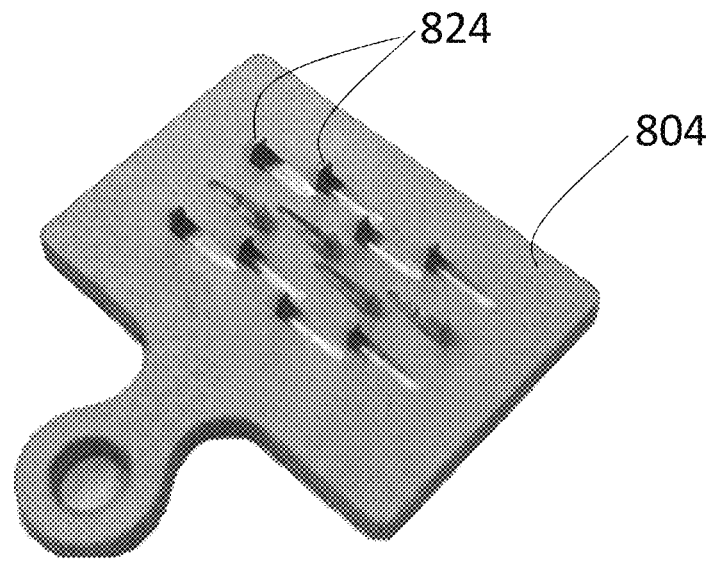
FIG. 8A is top a perspective view of an example backing plate including barbs.
Figure 8B:
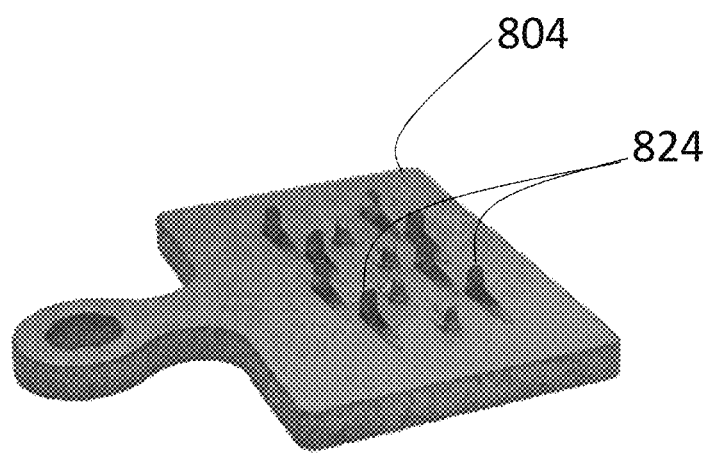
FIG. 8B is a side perspective view of the backing plate of FIG. 8A.

In some examples (not shown), in addition to or as an alternative to the use of adhesives, barbs on the rotor facing surfaces of the backing plates can be used to secure the backing plates to the friction pads, and thereby fix the spreader spring to the brake pads. Such barbs are described for example in U.S. Pat. No. 6,431,331 (Arbesman) and US Patent Application Publication No. 20160363183 (Arbesman et al.), both of which are incorporated herein by reference. In such examples, the friction pads can optionally be molded onto the backing plates, with the tines of the spreader spring between the friction pads and the backing plates. Alternatively, the friction pads can be pre-formed and then pressed on to the backing plates, with the tines of the spreader spring between the friction pads and the backing plates, to impale the friction pads on the barbs. In such cases, the barbs can optionally impale the tines, or can be flattened by the tines. An example of a backing plate 804 including barbs 824 is shown in FIG. 8. The backing plate 804 is shown prior to being secured to a friction pad.

In order to install the assembly, the spreader spring 110, first brake pad 102a, and second brake pad 102b—fixed together as a one-piece unit—can be inserted into a brake caliper. A metallic pin can then be inserted through the apertures 123a, 129a, 123b, 129b of the plates and leaves, in order to retain the assembly in position in the brake caliper. Since the parts are fixed together as a one-piece unit, the assembly can be inserted with relative ease, and the pin can be inserted through the assembly with relative ease. Furthermore, in order to remove the assembly (e.g. for replacement), the spreader spring 110, first brake pad 102a, and second brake pad 102b—fixed together as a one-piece unit—can be removed from the brake caliper The brake pads 102a, 102b shown in FIGS. 1 to 7 are sized and shaped to fit a particular model of brake caliper. In alternative examples, brake pad assemblies may include various other sizes and shapes of brake pads.

Figure 9:
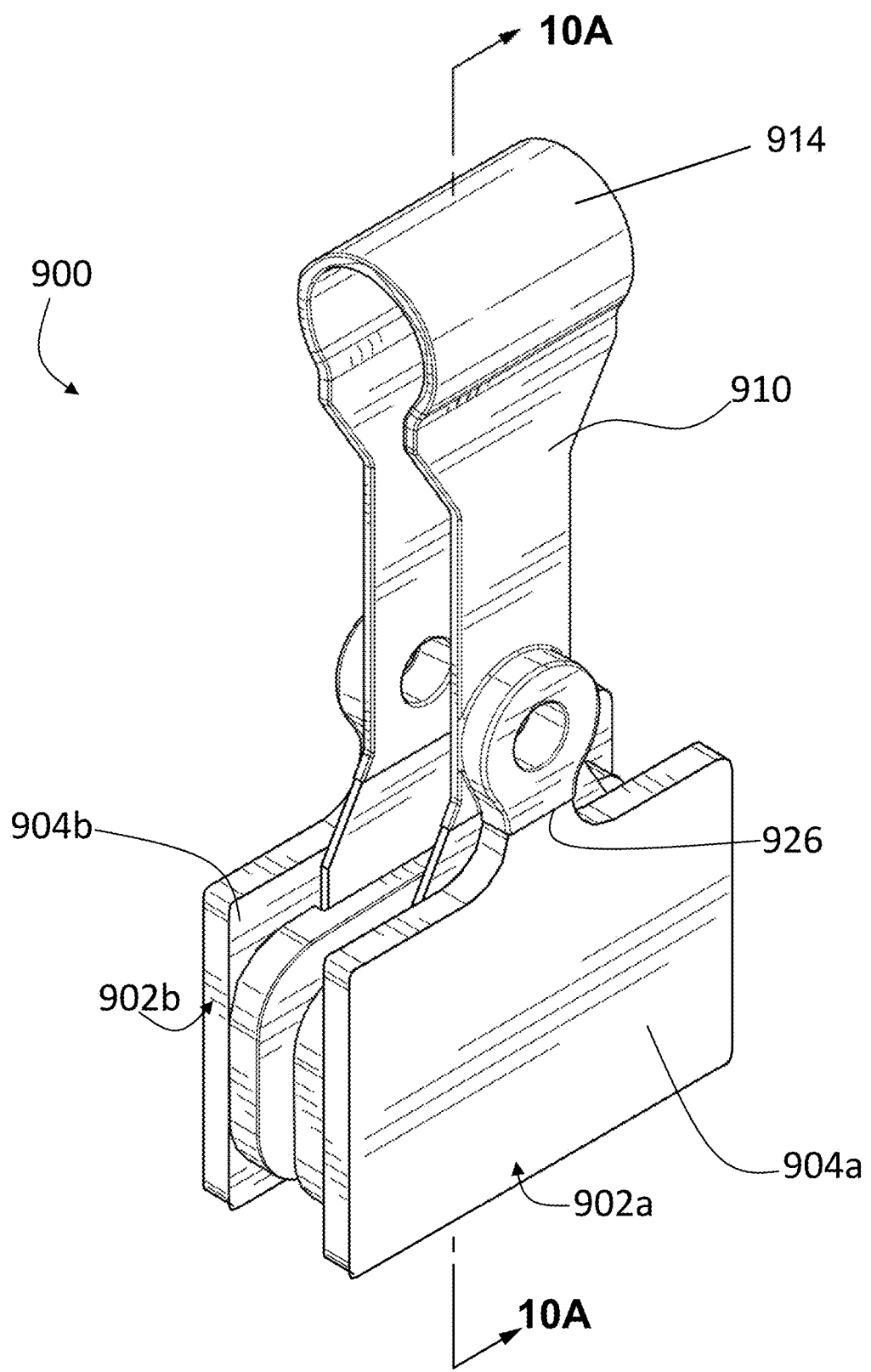
FIG. 9 is a perspective view of another example brake pad assembly.
Figure 10A:
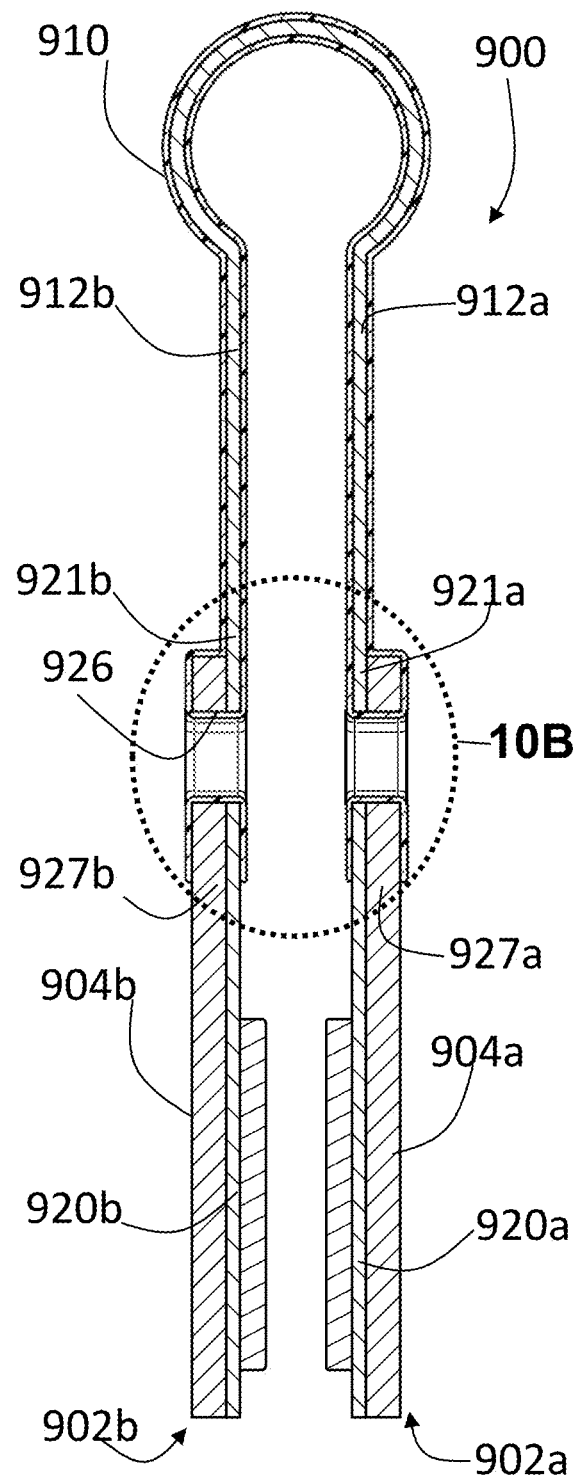
FIG. 10A is a cross section taken along line 10A-10A in FIG. 9.
Figure 10B:
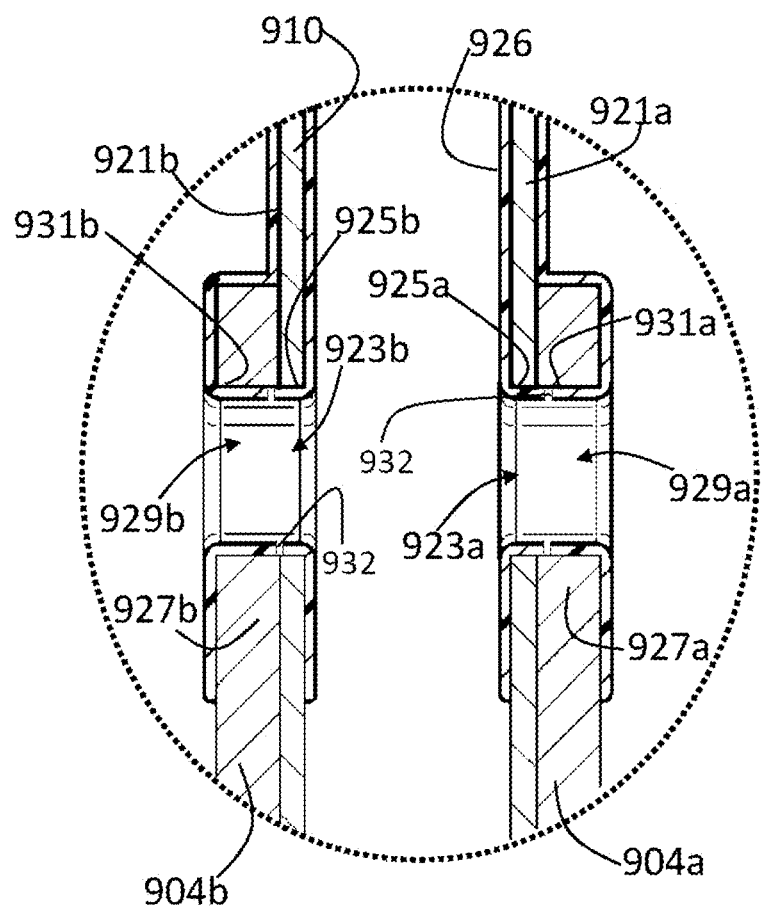
FIG. 10B is an enlarged view of the encircled portion of FIG. 10A.

Referring now to FIGS. 9, 10A, and 10B, another example brake pad assembly is shown. In FIGS. 9 to 10B, feature that are like those of FIGS. 1 to 7 will be identified with like reference characters as in FIGS. 1 to 7, incremented by 800.

In the example shown, brake pad assembly 900 is similar to that of FIGS. 1 to 8, but is configured to mitigate or reduce or prevent the generation of noise during braking, when the spreader spring 910 slides along the pin (not shown) between the compressed and spread positions. That is, referring to FIGS. 9 and 10A, the brake pad assembly 900 includes a barrier layer 926 that prevents metal-to-metal contact between the brake pad assembly 900 and the pin, and thereby mitigates or reduces or prevents noise that can be generated by metal sliding along metal. Referring to FIG. 10B, in order to prevent metal-to-metal contact, the barrier layer 926 can line the apertures of the spreader spring 910 and the backing plates 904a, 904b. That is, the barrier layer 926 can line the side wall 925a of the aperture 923a, the side wall 925b of the aperture 923b, the sidewall 931a of the aperture 929a, and the sidewall 931b of the aperture 929b, so that as the spreader spring 910 is compressed and spreads, metal-to-metal contact is avoided. Preferably, the barrier layer 926 lines an entirety of each side wall 925a, 925b, 931a, 931b, to avoid any potential sites of metal-to-metal contact. However, it is possible for the lining to include gaps 932.

The brake pad assembly 900 can be manufactured as described above with regards to FIGS. 1 to 8, followed by a dipping step to apply the barrier layer 926 to the sidewalls 925a, 925b, 931a, 931b. That is, the material for the barrier layer 926 can be prepared in a molten state, and the assembled one-piece unit of the spreader spring 910 and brake pads 904a, 904b can be dipped into the molten material. The dipping step can be carried out with the brake pad assembly 900 inverted with respect to the position shown in FIGS. 8 and 9, so that the spring joint 914 is first dipped into the molten material, followed by the leaves 912a, 912b and bosses 927a, 927b. The molten material can then be solidified (e.g. by curing, setting, or drying). In such examples the barrier layer 926 will line not only the side walls 925a, 925b, 931a, 931b, of the apertures 923a, 923b, 929a, 929b, but also the spring joint 914, a majority of the first body 921a, a majority of the second body 921b, the first boss 927a, and the second boss 927b. That is, the barrier layer 926 will be in the form of a unitary coating on the spring joint 914, the first leaf 912a, the second leaf 912b, the first boss 927a, and the second boss 927b.

The barrier layer 926 can be or can include any relatively durable material (i.e. any material that can withstand the forces applied during braking) that will not interfere with braking (i.e. that will allow for sliding of the brake pad assembly 900 along the pin), that will not generate substantial noise when the brake pad assembly 900 is slid along the pin, and that can preferably be applied by dip-coating. Example materials for the barrier layer include nylon, latex, rubberized materials, friction reducing polymers such as polytetrafluoroethylene (PTFE, Teflon®), silicone, graphite, lubricating paints (e.g. Molykote®), and/or an epoxies. The barrier layer can be relatively thin, for example less than 1 mm thick, or les than 0.5 mm thick, or between 0.05 and 0.5 mm thick.

The brake pad assembly 900 further differs from the assembly 100 in that each leaf 912a, 912b of the spreader spring 910 includes only a single tine. That is, the leaf 912a includes a first tine 920a joined to the first brake pad 902a, and the second leaf includes a second tine 920b joined to the second brake pad 902b.

While the above description provides examples of one or more processes or apparatuses, it will be appreciated that other processes or apparatuses may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, such disclaimer is hereby rescinded and retracted.

I claim:

1. A spreader spring for a bicycle brake pad assembly, comprising:
   a first leaf for fixing to a first brake pad, the first leaf having a first aperture extending therethrough for receipt of a pin, wherein the first aperture is defined by a first side wall;
   a second leaf for fixing to a second brake pad, the second leaf having a second aperture extending therethrough and aligned with the first aperture for receipt of the pin, wherein the second aperture is defined by a second side wall;
   a spring joint joining the first leaf to the second leaf, wherein the spring joint biases the spreader spring towards a spread position in which the first leaf and second leaf are spaced apart from each other, and is moveable to a compressed position in which the first leaf and second leaf are slid towards each other along the pin relative to the spread position; and
   a barrier layer lining at least the first side wall and the second side wall to prevent contact between the first side wall and the pin and the second side wall and the pin, to mitigate noise generated by sliding of the first leaf and second leaf along the pin,
   wherein the barrier layer comprises at least one gap.

2. The spreader spring of claim 1, wherein
   the first leaf comprises at least a first tine for fixing to the first brake pad, and a first body joining the first tine to the spring joint and through which the first aperture extends; and
   the barrier layer coats at least a majority of the first body.

3. The spreader spring of claim 2, wherein
   the second leaf comprises at least a second tine for fixing to the second brake pad, and a second body joining the second tine to the spring joint and through which the second aperture extends; and
   the barrier layer further coats at least a majority of the second body.

4. The spreader spring of claim 3, wherein the barrier layer further coats the spring joint.

5. The spreader spring of claim 1, wherein the barrier layer is in the form of a unitary coating applied to the spring joint, the first leaf, and the second leaf.

6. The spreader spring of claim 1, wherein the barrier layer lines an entirety of the first side wall and an entirety of the second side wall.

7. A brake pad assembly for a bicycle, comprising:
   a first brake pad having a first backing plate with a first rotor facing surface, and
   a first friction pad secured to the rotor facing surface;
   a second brake pad having a second backing plate with a second rotor facing surface, and a second friction pad secured to the second rotor facing surface and facing the first friction pad; and
   a spreader spring having a first leaf fixed to the first brake pad, a second leaf fixed to the second brake pad, and a spring joint joining the first leaf to the second leaf, wherein the first leaf has a first leaf aperture extending therethrough for receipt of a pin and the first leaf aperture is defined by a first side wall, wherein the second leaf has a second leaf aperture extending therethrough and aligned with the first leaf aperture for receipt of the pin, wherein the second leaf aperture is defined by a second side wall, wherein the spring joint biases the spreader spring towards a spread position in which the first leaf and second leaf are spaced apart from each other, and is moveable to a compressed position in which the first leaf and second leaf are slid towards each other along the pin relative to the spread position, and wherein the spreader spring further comprises a barrier layer lining at least the first side wall and the second side wall to prevent contact between the first side wall and the pin and the second side wall and the pin, to mitigate noise generated by sliding of the first leaf and second leaf along the pin,
   wherein the barrier layer comprises at least one gap.

8. The brake pad assembly of claim 7, wherein:
   the first leaf comprises at least a first tine fixed to the first brake pad, and a first body joining the first tine to the spring joint and through which the first leaf aperture extends;
   the first backing plate further comprises a first boss that overlies an outer surface of the first leaf, the first boss comprises a first boss aperture that is aligned with the first leaf aperture for receipt of the pin, and the first boss aperture is defined by a first boss aperture side wall; and
   the barrier layer further lines the first boss aperture side wall.

9. The brake pad assembly of claim 8, wherein
   the second leaf comprises at least a second tine fixed to the second brake pad, and a second body joining the second tine to the spring joint and through which the second leaf aperture extends;

the second backing plate further comprises a second boss that overlies an outer surface of the second leaf, the second boss comprises a second boss aperture that is aligned with the second leaf aperture for receipt of the pin, and the second boss aperture is defined by a second boss aperture side wall; and the barrier layer further lines the second boss aperture side wall.

10. The brake pad assembly of claim 9, wherein the barrier layer is in the form of a unitary coating applied to the spring joint, the first body, the second body, the first boss, and the second boss.

11. The brake pad assembly of claim 7, wherein the first leaf comprises at least a first tine fixed to the first brake pad, and a first body joining the first tine to the spring joint and through which the first leaf aperture extends; and the barrier layer coats at least a majority of the first body.

12. The brake pad assembly of claim 11, wherein the second leaf comprises at least a second tine fixed to the second brake pad, and a second body joining the second tine to the spring joint and through which the second leaf aperture extends;

the barrier layer further coats at least a majority of the second body.

13. The brake pad assembly of claim 12, wherein the barrier layer further coats the spring joint.

14. The brake pad assembly of claim 7, wherein the barrier layer is in the form of a unitary coating applied to the spring joint, the first leaf, and the second leaf.

15. The brake pad assembly of claim 7, wherein the barrier layer lines an entirety of the first side wall and an entirety of the second side wall.

16. A method of assembling a brake pad assembly for a bicycle, the method comprising:

a. fixing at least a first tine of a first leaf of a spreader spring to a first brake pad;
b. fixing at least a second tine of a second leaf of the spreader spring to a second brake pad;
c. dipping at least the spreader spring in a molten barrier material to coat a side wall of an aperture of the first leaf and a side wall of an aperture of the second leaf with the molten barrier material; and
d. solidifying the molten barrier material to yield a barrier layer lining the side wall of the aperture of the first leaf and the side wall of the aperture of the second leaf, wherein the barrier layer comprises at least one gap.

17. The method of claim 16, further comprising inserting a pin through the first aperture and second aperture to mount the brake pad assembly in a brake caliper.

18. The method of claim 17, further comprising compressing the spreader spring to slide the first leaf and second leaf towards each other along the pin.

19. The method of claim 16, wherein:

the first brake pad comprises a first boss that overlies an outer surface of the first leaf, and the first boss comprises a first boss aperture that is aligned with the aperture of the first leaf and that is defined by a first boss aperture side wall; and step c. further comprises dipping the first boss in the molten barrier material to coat the first boss aperture side wall with the molten barrier material.

20. The method of claim 19, wherein:

the second brake pad comprises a second boss that overlies an outer surface of the second leaf, and the second boss comprises a second boss aperture that is aligned with the aperture of the second leaf and that is defined by a second boss aperture side wall; and step c. further comprises dipping the second boss in the molten barrier material to coat the second boss aperture side wall with the molten barrier material.

* * * * *